Aug. 29, 1944.    H. A. BOUSHEY    2,356,746
JET PROPULSION DEVICE
Filed Feb. 26, 1942    3 Sheets-Sheet 1
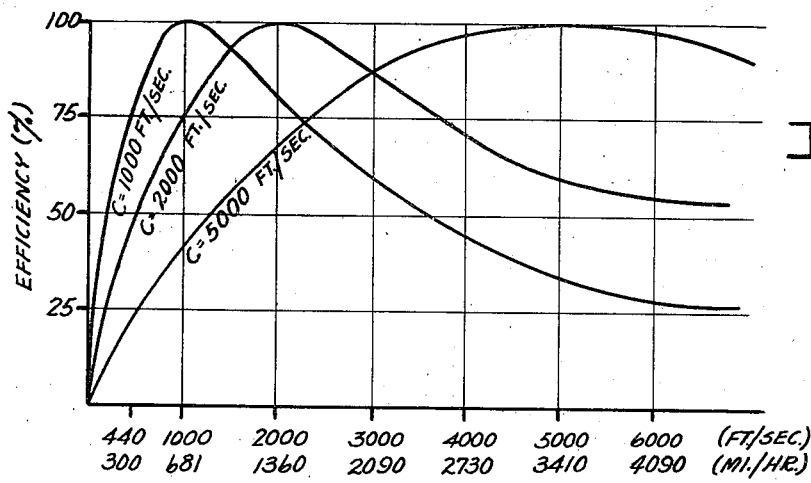
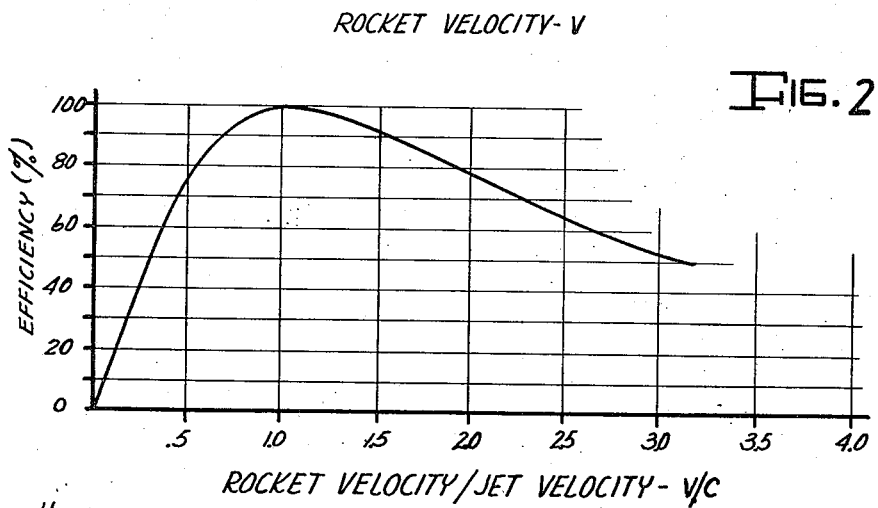
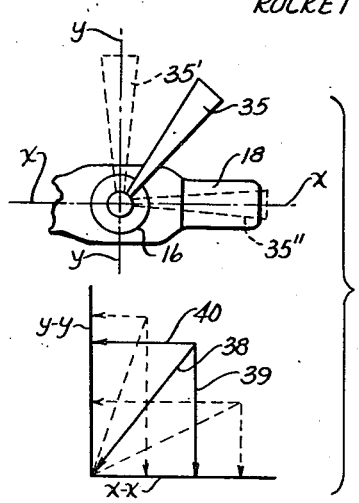
INVENTOR
HOMER A. BOUSHEY
ATTORNEYS Aug. 29, 1944. H. A. BOUSHEY 2,356,746
JET PROPULSION DEVICE
Filed Feb. 26, 1942 3 Sheets-Sheet 2

INVENTOR
HOMER A. BOUSHEY
BY
ATTORNEYS

Aug. 29, 1944.    H. A. BOUSHEY    2,356,746
JET PROPULSION DEVICE
Filed Feb. 26, 1942    3 Sheets-Sheet 3

INVENTOR
HOMER A. BOUSHEY
By
ATTORNEYS

Patented Aug. 29, 1944

2,356,746

UNITED STATES PATENT OFFICE 2,356,746

JET PROPULSION DEVICE

Homer A. Boushey, Hamilton Field, Calif.

Application February 26, 1942, Serial No. 432,447

11 Claims. (Cl. 244—73)

(Granted under the act of March 3, 1883, as amended April 30, 1928; 370 O. G. 757)

The invention described herein may be manufactured and used by or for Government for governmental purposes, without the payment to me of any royalty thereon.

This invention relates to a jet propulsion device for aircraft. It includes an arrangement whereby the reactive force developed by the jets can be used to rotate propellers which in turn propel the aircraft, or the aircraft may be propelled by direct jet reaction without the use of the propellers, or the aircraft may be propelled both by propellers and also by direct jet reaction.

During recent years countless types of rocket drives for aircraft have been proposed, none of which, however, have proved successful. This is largely due to the fact that the schemes thus far suggested have been either too visionary or else too prosaic. Either it is proposed to drive the craft by rocket propulsion alone or else to drive them by the use of conventional propellers driven in turn by jet reaction turbines. The pure rocket drive is impractical on account of the enormous amount of power required for take-off and for operation through the relatively dense air surrounding the earth. Conversely, a propeller driven by a jet reaction turbine while efficient at low altitudes is very inefficient in the thin air of the stratosphere where the propeller loses its traction.

In order to overcome this difficulty I have devised a jet reaction drive which combines the advantages of the jet reaction drive with that of the propeller drive, thus providing efficient propulsion of the aircraft both at low and high altitudes. I accomplish this by the use of a pinwheel type of jet reaction turbine in which provision is made for varying the direction of thrust created by the jets so as to cause either rotation of the wheel, thrust along the axis of the wheel, or a combination of the two. Thus propulsion of the aircraft may be effected through propellers geared to the wheel, through pure jet reaction, or through both.

Accordingly it is an object of my invention to provide a jet propulsion device for aircraft in which the propulsive efficiency of the jet or rocket motor is considerably increased.

A particular object of my invention is to provide a jet reaction motor which may be used to propel aircraft either through a propeller drive, through a jet reaction drive, or through a combination of the two.

A more particular object of my invention is to provide a pinwheel jet reaction turbine in which the reactive thrust of the jets may be gradually varied from that of a torque thrust to that of an axial thrust.

In general, my device is comprised of a plurality of independent rocket motors mounted on the ends of arms or spokes which are rotatably mounted in the framework of the aircraft. Provision is made for varying the reactive thrust of these motors from that of a pure torque thrust to that of a pure axial thrust. I have devised two modifications for accomplishing this result. In one of these modifications the motors are rotatably mounted on the arms and means is provided for rotating all of the motors in unison so that the direction of thrust may be varied from one extreme to the other. In the other modification two groups of jet motors are utilized, one group being disposed with their nozzles lying within the plane of rotation of the supporting arms, and the other group of motors having their nozzles disposed at right angles to such plane of rotation. By supplying fuel to the former group of motors a torque thrust will be developed, while an axial thrust will be produced when fuel is supplied to the latter group of motors. By supplying fuel in varying amounts to both groups of motors, a varying combination of torque and axial thrust may be secured.

In either case the torque thrust is utilized to rotate the pinwheel device and thereby cause compression of the air or combustible mixture in the spokes thereof and also to drive the propeller, or propellers, which are connected to the pinwheel device through a reduction gearing. As the aircraft reaches higher altitudes the pinwheel device is adjusted to produce a certain amount of axial thrust so as to supplement the thrust produced by the propeller. For conditions of flight where propeller operation is decidedly inefficient, the propeller may be entirely disconnected by means of a clutch arrangement. Thus by the use of my device, efficient operation of the aircraft is secured at all altitudes, the efficient propeller drive being utilized for take-off and climb and the direct reaction thrust being utilized for cruising in the stratosphere. The above and other advantageous features of my invention will hereinafter more fully appear with reference to the accompanying drawings, in which:

Figure 1 is a graph of propulsive efficiency versus forward speed of the rocket for a family of jet velocity curves.

Figure 2 is a graph of propulsive efficiency versus the ratio of forward rocket velocity to jet velocity.

Figure 6 is a diagrammatic view showing the manner in which the reactive effect of the jet issuing from the nozzle of one of the rocket motors may be resolved into a torque thrust component and an axial thrust component.

Figure 4:
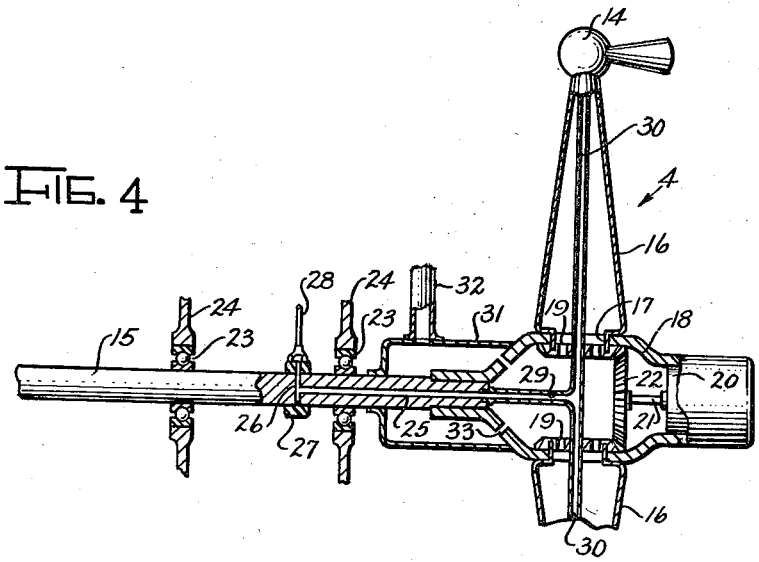
Figure 4 is a sectional elevation of one modification of my device in which provision is made for varying the angular position of the rocket motors with respect to the axis of rotation in order to secure varying combinations of torque and axial thrust.

My device depends for its operation upon the thrust produced by rocket motors mounted on the outer ends of arms which are adapted to rotate about a central axis in the same manner that the spokes of a wheel rotate about the axle. Each of the rocket motors consists of a combustion chamber and a nozzle, the fuel and an oxidizer being burned in the combustion chamber and then expanded into the atmosphere through the nozzle. I have not shown the details of these rocket motors inasmuch as they are old and well known in the art and reference may be had to United States Patent No. 2,074,098, issued on March 16, 1937, to H. L. Adams, for a more detailed description of the same. In these motors air is the working fluid. The air is drawn in through the hub of the pinwheel device, compressed in the hollow arms or spokes thereof, and then delivered to the rocket motors under pressure. Heat is added to the air by the addition of fuel thereto, which fuel may be any of the natural or synthetic hydrocarbons commonly used today in internal combustion engines. The fuel and air mixture is ignited in the combustion chambers whereupon the air is expanded and ejected through the nozzles into the atmosphere. The reaction from the jet issuing from the nozzles supplies a thrust which is utilized for propelling the air craft. This, of course, is in accordance with Newton's third law of motion, i. e., "For every action there is an opposite and equal reaction."

Rocket motors are, potentially at least, very efficient. The thermal efficiency may be expressed by the relation between the kinetic energy actually contained in the exhaust jet and the total energy contained in the fuel consumed.

$$E_{th} = \frac{\text{kinetic energy of jet gases}}{\text{energy contained in fuel}}$$

$$E_{th} = \frac{\frac{1}{2} mc^2}{w_f \times H}$$

$$E_{th} = \frac{\frac{1}{2} \left(\frac{w_o + w_f}{g}\right) c^2}{w_f \times \text{B. t. u.} \times 778} \times 100$$

where:
$m$ = mass of ejected gases.
$c$ = effective velocity of ejected gases (ft./sec.)
$E_{th}$ = thermal efficiency (%)
$w_f$ = weight of fuel (lbs./sec.)
$w_o$ = weight of oxygen, or oxidizer (lbs./sec.)
$H$ = heat content of fuel (B. t. u. per pound times the mechanical equivalent of heat)

It is evident from an inspection of the formula that the most important factor influencing thermal efficiency is the jet velocity of the exhaust gases. The specific heat content of the fuel will not effect thermal efficiency. However, for aircraft use where the fuel must be carried as a portion of the useful load it is important that the fuel having the greatest specific heat content be utilized. However, a high jet velocity will be required to obtain good thermal efficiency. The forward speed of the rocket or airplane will not affect thermal efficiency.

The construction and repeated operation of fairly efficient rocket motors using gasoline, alcohol, etc., with gaseous or liquid oxidizing agents, is an accomplished fact and the many advantages inherent to the rocket are well known. Since my invention is not concerned with the rocket motor, but merely with a method whereby its power can be better utilized, I shall not discuss the basic rocket motor further.

The propulsive, or ballistic efficiency of a rocket is dependent upon the exhaust velocity of the expelled gas (i. e., actual jet velocity), and the velocity of the rocket or rocket motor. It may be computed from:

$$E_p = \frac{2cv}{c^2 + v^2} \times 100$$

where:
$E_p$ = propulsive or ballistic efficiency
$c$ = velocity of expelled exhaust gas (ft./sec.)
$v$ = actual velocity of rocket, or rocket motor (ft./sec.)

From the above, it is evident that at a rocket speed equal to the jet velocity, the propulsive efficiency would be 100%, again by virtue of Newton's third law of motion. (This is obviously true, for if the absolute velocity of the expelled gas be zero, then its kinetic energy would also be zero. Hence all its energy, or 100% would have been utilized to propel the rocket casing forward.)

Figure 1, which is a graph of propulsive efficiency versus forward speed of the rocket, illustrates this relationship for a family of jet velocity curves. This formula is rather cumbersome to use, hence we may plot efficiency against the ratio of forward speed to jet velocity. (See Figure 2.) By dividing both numerator and denominator of the above formula by $c^2$ we obtain:

$$E_p = \frac{2\frac{v}{c}}{1 + \left(\frac{v}{c}\right)^2}$$

Then: substituting $x$ for $$\frac{v}{c}$$

and $y$ for $E_p$ we obtain the equation of the curve:

$$y = \frac{2x}{x^2 + 1}$$

which is recognized in its familiar form as shown by Figure 2.

A consideration of Figure 2 indicates the desirability of obtaining low jet velocities, provided that thermal efficiency can be kept at a reasonably high value. Two methods of obtaining just such a result have been suggested. If an alcohol fuel is utilized, the exhaust gas velocity may be reduced by mixing water with the alcohol. Any desired proportions may be utilized, since alcohol and water are 100% miscible. The heat developed in the combustion chamber of the rocket by the combustion of the alcohol would convert the water to steam, reducing both the temperature developed within the chamber and also the expelled gas velocity. Water used in conjunction with any other fuel would give about the same result, except that it might be slightly more difficult to feed the water into the combustion chamber in the proper proportions. The disadvantage of this suggestion is that, even though propulsive efficiency might be increased without a sacrifice of thermal efficiency, the fuel carried in the airplane would be an "impotent" watered mixture, having comparatively low B. t. u. per lb. On the ground, the use of water might prove very desirable, but for any consideration where water would have to be carried as a portion of the fuel load of an airplane, it offers no advantage.

Another suggestion accomplishes approximately the same result, but uses large amounts of air in place of water. The excess air would absorb heat from the combustion chamber, and also reduce the exhaust gas velocity. An air compressor could be carried in the airplane, which would be driven by the jet motors. This would eliminate the need to carry liquid oxygen, and the required fuel load could be reduced approximately four and one-half times, yet all the advantages of using a "watered" fuel could be obtained.

Theoretical exhaust gas velocities for various fuels differ widely, the maximum value being obtained with liquid hydrogen and liquid oxygen. Gasoline and alcohol with liquid oxygen have found the greatest favor as rocket fuels, and the actual exhaust gas velocities obtained have been around 4000 to 8000 ft./sec. To obtain 100% propulsive efficiency with these exhaust gas velocities, the rocket, or rocket motor, would have to travel at an equal speed, or 2730 M. P. H. and 5460 M. P. H. respectively. Very probably, such tremendous speeds could only be realized at great altitude in rarefied air, or in the vacuum beyond the earth's atmosphere. It is interesting to note that a rocket becomes more efficient in a vacuum. However, even though the high speeds necessary for high propulsive efficiency be attained, the problem of achieving efficient propulsion during the climb and acceleration period while still in the comparatively dense atmosphere of the earth still remains.

It is the purpose of my invention to provide means whereby the propulsive efficiency of a rocket motor can be increased. The device is particularly adaptable as a power unit for aircraft which travel at comparatively slow speeds through air. My invention also provides means whereby a gradual change from propeller propulsion to direct rocket, or jet propulsion, can be effected. Rocket, or jet propulsion alone would be desirable only when traveling at extremely high speeds through the rarefied atmosphere prevailing at very high altitudes, or for travel through vacuum, as in these cases propeller propulsion would be inefficient if not impossible. Also, since my proposed device will develop torque as well as forward thrust, and since it would operate at high rotational speeds, it is admirably suited to drive a self-contained air compressor, and gain the advantages arising through the use of an excess of air.

Figure 3:
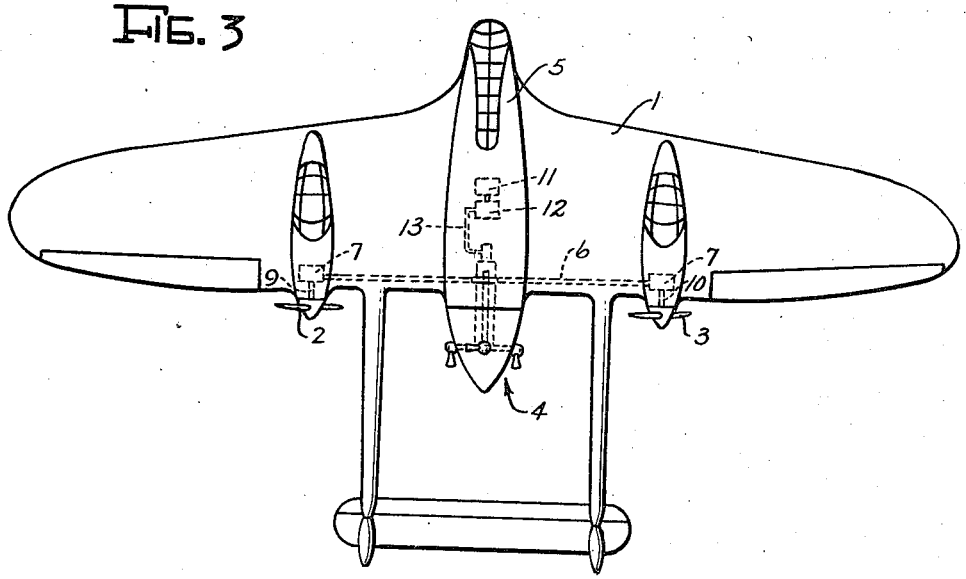
Figure 3 is a plan view of an aircraft having my jet propulsion device installed therein. The particular arrangement of the pusher propellers and pinwheel device herein shown is merely one example of the many possible arrangements which could be utilized.

The general manner in which my device may be used on an aircraft of modern design is shown in Figure 3. The aircraft 1 is provided with two pusher propellers 2 and 3 located in nacelles provided in the wings of the craft. It is preferable that these propellers be of the controllable pitch type and also that they be capable of full-feathering action so that when the propeller drive is discontinued and the craft propelled by pure jet reaction alone, the propellers may be feathered and the drag therefrom reduced as much as possible. The jet reaction motor indicated generally at 4 is housed in the rear portion of the central nacelle 5. The propellers 2 and 3 are rotatably driven by the motor 4 through a propeller shaft 6 which is geared to the drive-shaft of the motor. At each end of this shaft there is provided a throw-out clutch 7 by means of which the propeller shafts 9 and 10 may be disconnectably driven by the shaft 6. A small internal combustion engine 11 drives an air compressor 12 for the purpose of supplying air under pressure through the conduit 13 to the jet motor 4 for the purpose of starting the same. After the jet motor has been brought up to speed it will compress its own air in the spokes thereof and the auxiliary engine and compressor set 11 and 12 may then be dispensed with.

One possible construction of the pinwheel device which utilizes a conventional propeller pitch-changing mechanism is shown in Figure 4. In this modification the rocket motors 14 are attached to the outer ends of arms which are mounted on the end of a drive-shaft 15. Each of the arms is comprised of an outer casing 16 of tapered construction and formed with a reduced portion 17 at its inner end. This reduced portion passes through an opening of equal size provided in a hub member 18. Within the hub member a bevel gear 19 is rigidly secured to the reduced portion 17. Thus the arms are free to rotate about their longitudinal axes so as to enable rotation of the rocket motors mounted on the outer ends of the arms. A small electric motor 20, having a self-contained reduction gearing, is mounted in the forward end of the hub member and the output shaft 21 of this motor is provided with a bevel gear 22 which meshes with each of the bevel gears 19. Thus, when electric motor 20 is energized, the bevel gear 22 will be rotated so as to cause rotation of the arms 16 and thus change the angular positions of the rocket motors 14 as desired. Electric current may be supplied to the motor 20 through suitable slip rings provided on the hub member 18.

The hub member 18 is rigidly secured to the end of the drive-shaft 15. This drive-shaft is rotatably mounted in bearings 23 supported by the frame members 24 of the aircraft structure. The shaft 15 is provided with a central bore 25 which, at its left-hand end, communicates with a hole 26 drilled diametrically through the shaft. A stationary collar 27 has attached thereto a fuel supply conduit 28 by means of which fuel from the supply source is delivered to the hole 26 and the bore 25. A fuel conduit 29 is attached to the right-hand end of the shaft 15 and is provided with delivery branches 30 passing through the interior of each of the arms 16 and terminating within the combustion chamber of each of the rocket motors 14. In this manner fuel is conveyed from the supply source to the interior of each of the combustion chambers of the individual motors. A metal housing 31, to which is attached an air supply conduit 32, surrounds a portion of the hub 18 and the shaft 15. This housing is made stationary with respect to the frame of the aircraft, suitable bearing surfaces being provided where it contacts the shaft and the hub. A series of holes 33 is provided in the hub 18 in order that air may be drawn into the interior of the hub from the housing 31 so as to furnish an air supply for each of the rocket motors 14. The air may pass from the interior of the hub into each of the hollow arms 16 through suitable openings provided in the bevel gears 19. In the arms 16 the air is compressed by the centrifugal force acting thereon as the arms rotate after which it is supplied to the rocket motors through suitable openings provided in the combustion chambers thereof.

Since it will be necessary to supply compressed air into the housing 31 and hub 18 for the purpose of starting the pinwheel device, the conduit 32 is preferably connected to the compressed air line 13 of the auxiliary compressor 12 shown in Figure 3. After the pinwheel device has been brought up to speed this connection may then be severed and the pinwheel device permitted to draw in its own supply of air through the conduit.

It is preferable that the supporting arms 16 be arranged to rotate through 90 degrees so that the expelled gas from the nozzles of the rocket motors may be directed at right angles to the axis of rotation, directly rearward and parallel to this axis, or at any desired angle lying between these limits. In other words, the force obtained from the rocket blast could be directed to give a maximum rotational component with zero forward thrust, or a maximum forward thrust component with a zero rotational component, or any intermediate combination.

However, it might prove quite advantageous to alter the angle of the rocket nozzles rearward only to a limited degree so that the rotational component of their reaction would still furnish sufficient torque to drive the pinwheel at a high rotational speed with or without rotating the propeller. This high rotational speed is necessary in order to continue the compressor action of the device since air is admitted to the hub and compressed in the hollow arms by centrifugal force prior to its entering the rocket chambers. Also, the varying of the nozzle angles will permit a smooth and gradual change from propeller propulsion to rocket propulsion with a blend of the two occurring at all intermediate angles.

The manner in which the reactive thrust of the jets issuing from the motor nozzles may be resolved into torque and axial thrust components for various positions of the motors is best shown in Figure 6. As here shown, the nozzle 35 occupies a position intermediate its terminal positions 35' and 35" (shown in dotted outlines). In the position 35', the longitudinal axis $y—y$ of the nozzle lies at right angles to the axis of rotation $x—x$ of the pinwheel while in the position 35" the longitudinal axis of the nozzle coincides with the axis of rotation. The reaction from the nozzle in the former case results in a pure torque thrust being applied to the pinwheel thus causing it to spin about its axis, while the reaction from the nozzle in the latter case results in a pure axial thrust being applied thereto so as to cause linear displacement of the pinwheel along its axis. In all intermediate positions of the nozzle such as in the full-line position 35, the thrust thereof will have both a torque component and also an axial component. In the vector diagram shown in Figure 6, the thrust of the nozzle when it occupies the position 35 is represented by the vector 38. This vector may be resolved into a torque component 39 and an axial component 40 as may also the resultant thrust for any other position of the nozzle (see dotted vectors).

Figure 5:
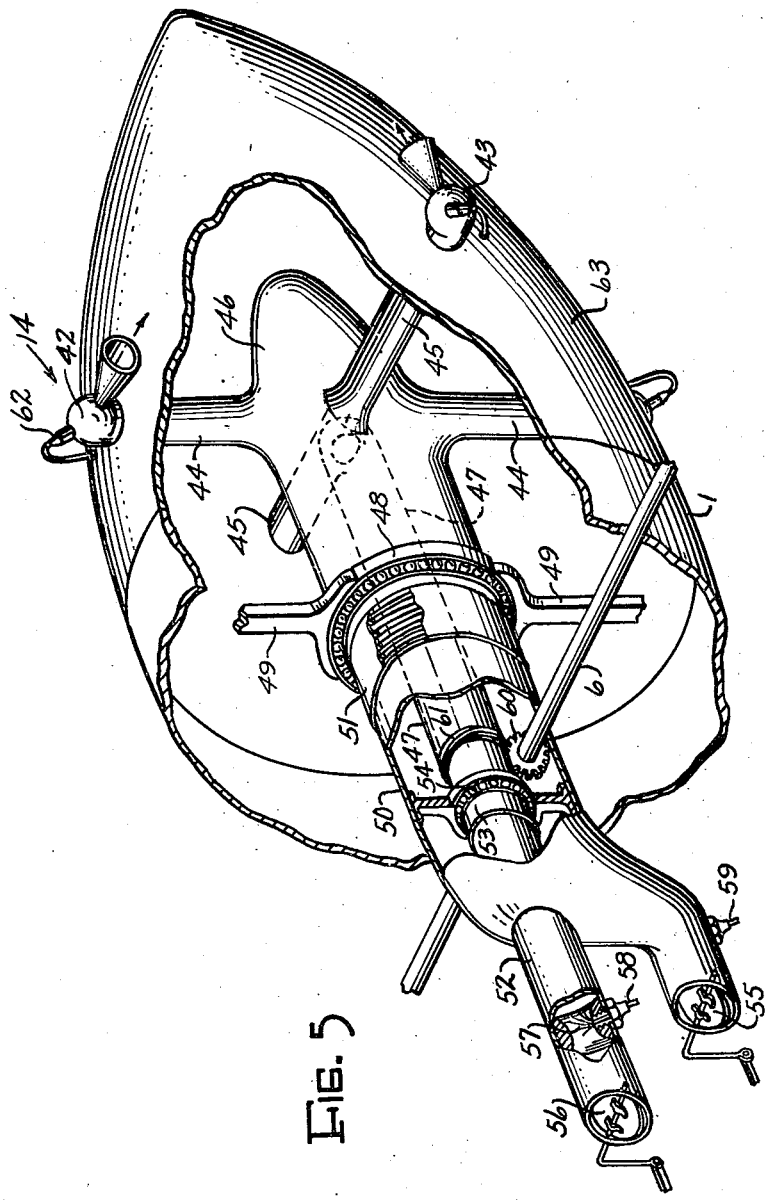
Figure 5 is a perspective view of another modification of my device with parts cut away so as to more clearly show the internal construction of same. In this modification two groups of stationary rocket motors are utilized, one group having their nozzles lying within the plane of rotation of the spokes and the other group having their nozzles lying at right angles to this plane.

Instead of rotating the jet motors 14 to secure varying angles of thrust, the same result may be effected in the manner shown in Figure 5. Two groups of rocket motors 14 are provided, one group 42 having their nozzles lying within the plane of rotation of the arms and the other group 43 having their nozzles lying at the right angles to this plane. By supplying fuel to the first-mentioned group of motors a torque reaction will be effected, whereas by supplying fuel to the second-mentioned group of motors an axial thrust will be obtained. By supplying varying amounts of fuel to both of the groups simultaneously, varying combinations of torque and axial thrust may be secured. For ordinary operation the motors 42 would furnish all the torque that the propellers could absorb. For "super-performance" periods, when high efficiency is not the primary consideration, the motors 43 would be operated also so as to provide a powerful boost to the aircraft.

The motors of group 42 are fixedly attached to the outer ends of the hollow arms 44 whereas the motors of the other group are similarly attached to the outer ends of hollow arms 45. The arms 44 are attached to a tubular casing 46, a mixture of fuel and air being supplied to the motors from the interior of this casing through the arms 44. The arms 45 extend within the casing 46 where they are attached to and communicate with a hollow conduit 47 which is supported within the casing 46 by means of suitable spider supports. The casing 46 is mounted for rotation about its central axis by means of double-row ball bearing 48 which is supported within the airplane frame by means of the frame members 49. A stationary casing 50 is communicatively connected with the casing 46 by means of a labyrinth gland 51. The casing 50 is formed with a right-angle bend in its left-hand end so as to permit the insertion of a tube 52 therethrough. This tube communicates with the end of the tube 47 through a labyrinth gland 53, the left-hand end of the tube 47 being supported for rotation with respect to the casing 50 by means of a ball bearing 54. In the ends of the casing 50 and the tube 52 are provided butterfly valves 55 and 56, respectively, for controlling the supply of air to the two sets of arms. A venturi 57 is provided immediately behind each of the butterfly valves and fuel is injected at each of the venturis by means of fuel lines 58 and 59. A worm wheel 60 secured to the propeller shaft 6 (see also Figure 3), meshes with a worm 61 fastened to the tube 47. The propellers of the aircraft are rotatably driven by means of the shaft 6, a clutch preferably being interposed between this shaft and the propellers so as to permit rotation of the pinwheel without corresponding rotation of the propellers.

From the above it will be observed that if the butterfly valve 56 is closed so as to prevent the combustible mixture within the tube 47 from being delivered to the group of rocket motors 43 while the butterfly valve 55 is opened so as to permit the combustible mixture within the casing 46 to be supplied to the group of motors 42, the pinwheel device will be rotated at high speed and the propellers of the aircraft will be driven at full power as would be desirable for the take-off of the aircraft. With the considerations of strength and centrifugal force permitting, the pinwheel would be permitted to rotate at a peripheral speed equal to the exhaust gas velocity and hence approach 100 percent propulsive efficiency. The advantages, of course, would be all those contained in the rocket thus giving a device capable of greater simplicity, greater efficiency, and a higher horsepower-weight ratio than any engine in existence today. By opening the butterfly valve 56 and allowing the valve 55 to remain open, the combustible mixture will be supplied to both groups of motors and a combination of torque and axial thrust will be produced by the device. Thus, not only will the propellers be rotated but jet propulsion will also be effected so as to efficiently drive the craft through the intermediate altitudes existing between ground level and the stratosphere. By partially closing the valve 55 so as to reduce the torque reaction produced by the group of motors 42 to such an extent that only so much rotation of the device will be produced as is necessary to compress the air in the hollow arms 44 and 45, the aircraft will be propelled principally by jet reaction and thus be efficiently operated in the thin air of the stratosphere.

The rocket motors 14 are provided with spark plugs 62 for igniting the combustible mixture present in the combustion chambers when the device is being set into operation. Once the fuel has been ignited and the device brought up to speed, the combustion will be self-sustaining and continued operation of the spark plugs 62 will no longer be necessary.

Since the pinwheel must rotate at very high speeds in order to be efficient, the arms 44 and 45 are preferably encased in a fairing or spinner 63 so as to reduce the windage losses as much as possible.

The operation of my device when installed on an airplane such as that shown in Figure 3 is as follows:

The engine-compressor set 11, 12 is set into operation so as to furnish a supply of compressed air to the rocket motors for starting the pinwheel device. As previously mentioned, this supply of air may be discontinued after the pinwheel has been brought up to speed, the air for the motors then being compressed by the centrifugal force acting on the air contained in the arms of the device. The clutches 7 are then engaged so as to cause rotation of the propellers after which the airplane may take off and commence its climb to higher altitudes. During the climb, an axial component of thrust may be introduced by the pinwheel device in addition to the torque component, thus causing propulsion both by the propellers and also by pure jet reaction. The axial component may be steadily increased until the airplane reaches the stratosphere where the clutches 7 are disengaged, the propellers feathered, and the torque component reduced to that necessary to maintain sufficient compression in the arms of the pinwheel to properly maintain combustion in the motors 14.

It may be found desirable to drive an auxiliary air compressor from the shaft of the pinwheel device when operating at high altitudes so as to ensure a substantial supply of excess air for the motors at all times. As the aircraft reaches higher and higher altitudes, the mixture ratio for a given power output becomes richer and richer thus causing an increase in the combustion chamber temperatures of the rocket motors. To avoid excessive temperatures, the auxiliary air compressor could be engaged so as to furnish an excess of air to the motors. It would be a simple matter to declutch the propellers from the pinwheel drive at the appropriate time and clutch in an auxiliary air compressor in their stead. The use of such a compressor would also aid in maintaining high efficiencies since excess air increases thermal efficiency.

It will be seen from the above that I have devised a jet propulsion device which is capable of efficient operation of aircraft at all altitudes beginning with the take-off at ground level and continuing progressively up into the statosphere where the aircraft may efficiently cruise at extremely high speeds through the thin air. The device which I have shown in the drawings is but a specific embodiment of my invention which may be altered or modified as found desirable. It is, therefore, to be understood that my invention is not limited to the specific construction shown, but that its limits are rather to be determined by the scope of the appended claims.

I claim:

1. A jet propulsion device for aircraft comprising a plurality of radially disposed arms mounted for rotation about a central axis, a rocket motor mounted on the outer end of each of said arms, a feathering propeller adapted to be rotatably driven by said arms as the latter rotate, clutch means for interrupting the drive of said propeller by said arms, and means for so controlling said motors as to cause the latter to impart to said arms either a rotation about said central axis, a thrust parallel to said central axis, or any desired combination of the two whereby with the motors controlled so as to produce a thrust parallel to said central axis, with the clutch disengaged, and with the propeller feathered, jet propulsion of the aircraft may be effected.

2. A jet propulsion device for aircraft comprising two groups of rocket motors mounted for rotation about a central axis, the motors of one group being so disposed as to produce a torque thrust about said central axis and the motors of the other group being so disposed as to produce a linear thrust parallel to said axis, and means for independently controlling the flow of fuel to each of said groups of motors whereby either a torque thrust, an axial thrust or any desired combination thereof may be secured.

3. A jet propulsion device for aircraft comprising a wheel-like member mounted for rotation about its central axis, two groups of rocket motors spaced around the periphery of said member, the motors of one group being so disposed as to produce a torque thrust about said central axis and the motors of the other group being so disposed as to produce a linear thrust parallel to said axis, and means for independently controlling the flow of fuel to each of said groups of motors whereby either a torque thrust, an axial thrust, or any desired combination thereof may be secured.

4. A jet propulsion device for aircraft comprising a plurality of radially disposed arms mounted for rotation about a central axis, a rocket motor attached to the outer end of each of said arms, one group of said motors being so disposed as to produce a torque thrust about said central axis and another group of said motors being so disposed as to produce a linear thrust parallel to said axis, and means for independently controlling the flow of fuel to each of said groups of motors whereby either a torque thrust, an axial thrust, or any desired combination thereof may be secured.

5. A jet propulsion device for aircraft comprising a hub member mounted for rotation about its central axis in the framework of said aircraft, a plurality of arms radiating from said hub member at right angles to said axis, a rocket motor mounted on the outer end of each of said arms, one group of said motors being so disposed as to produce a torque thrust about said central axis and another group of motors being so disposed as to produce a linear thrust parallel to said axis, a propeller mounted for rotation in the framework of said aircraft, means drivably connecting said hub member with said propeller, and means for independently controlling the flow of fuel to each of said groups of motors whereby either a propeller drive, a jet reaction drive, or any desired combination of the two may be utilized for propelling the aircraft.

6. A jet propulsion device for aircraft comprising a hollow hub member mounted for rotation about its central axis, a plurality of tubular arms radiating from said hub member at right angles to said axis, a rocket motor mounted on the outer end of each of said arms, one group of motors being so positioned as to produce a torque thrust about said central axis and another group of motors being so positioned as to produce a linear thrust parallel to said axis, and means for independently controlling the flow of fuel through said hub member and said arms to each of said groups of motors whereby either a torque thrust, a linear thrust, or any desired combination thereof may be secured.

7. A jet propulsion device for aircraft comprising a hollow hub member mounted for rotation about its central axis in the framework of said aircraft, a plurality of tubular arms radiating from said hub member at right angles to said axis, a rocket motor including a combustion chamber and a nozzle mounted on the outer end of each of said arms, one group of said motors having their nozzles disposed within the plane of rotation of said arms and another group of said motors having their nozzles disposed at right angles to said plane of rotation, a propeller mounted for rotation in the framework of said aircraft, means drivably connecting said hub member with said propeller, separate conduit means for conducting fuel to each of said groups of motors, and means for controlling the flow of fuel through each of said conduit means whereupon, by manipulation of said control means, either a propeller drive, a jet reaction drive, or any desired combination of the two may be utilized for propelling the aircraft.

8. A jet propulsion device for aircraft comprising a drive shaft journalled in the framework of said aircraft, a hub secured to said shaft and adapted to rotate therewith, a plurality of tubular arms extending radially from said hub, a rocket motor secured to the outer end of each of said arms, the air supply for said rocket motors being compressed in said tubular arms by centrifugal force as said arms rotate with said hub, one or more airscrews mounted for rotation in the framework of said aircraft, disconnectable means for driving said airscrews from said shaft, and means for causing said rocket motors to impart to said arms either a rotative thrust, a thrust parallel to the axis of said shaft, or a combination of the two, whereby said aircraft may be propelled either by an airscrew drive, by a jet reaction drive with said airscrews disconnected or by a combination of airscrew and jet reaction drive.

9. The invention as defined in claim 8 wherein said airscrews are of the full-feathering type.

10. The invention as defined in claim 8 wherein said causing means includes means for simultaneously varying the angular positions of each of said rocket motors with respect to the axis of said drive shaft.

11. The invention as defined in claim 8 wherein said causing means includes one group of rocket motors so disposed as to impart a rotative thrust to said arms, and a second group of rocket motors so disposed as to impart a thrust parallel to the axis of said shaft to said arms, separate conduit means for supplying fuel to each of said groups of motors, and means for regulating the amount of fuel supplied by said conduits to each of said groups of motors.

HOMER A. BOUSHEY.